Feb. 20, 1945.   H. P. SMITH   2,369,759
AGRICULTURAL IMPLEMENT
Filed Feb. 13, 1943   2 Sheets-Sheet 1
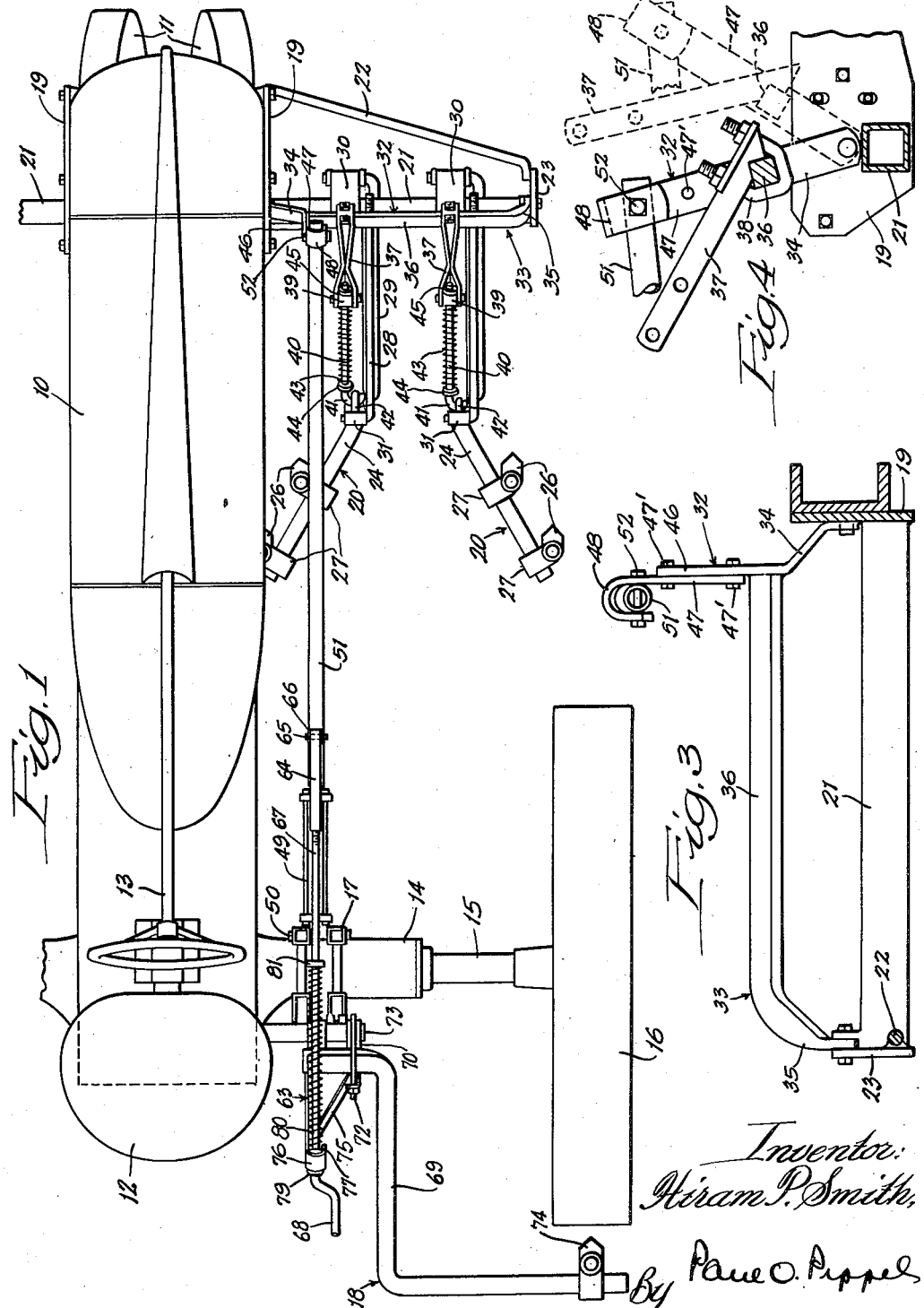

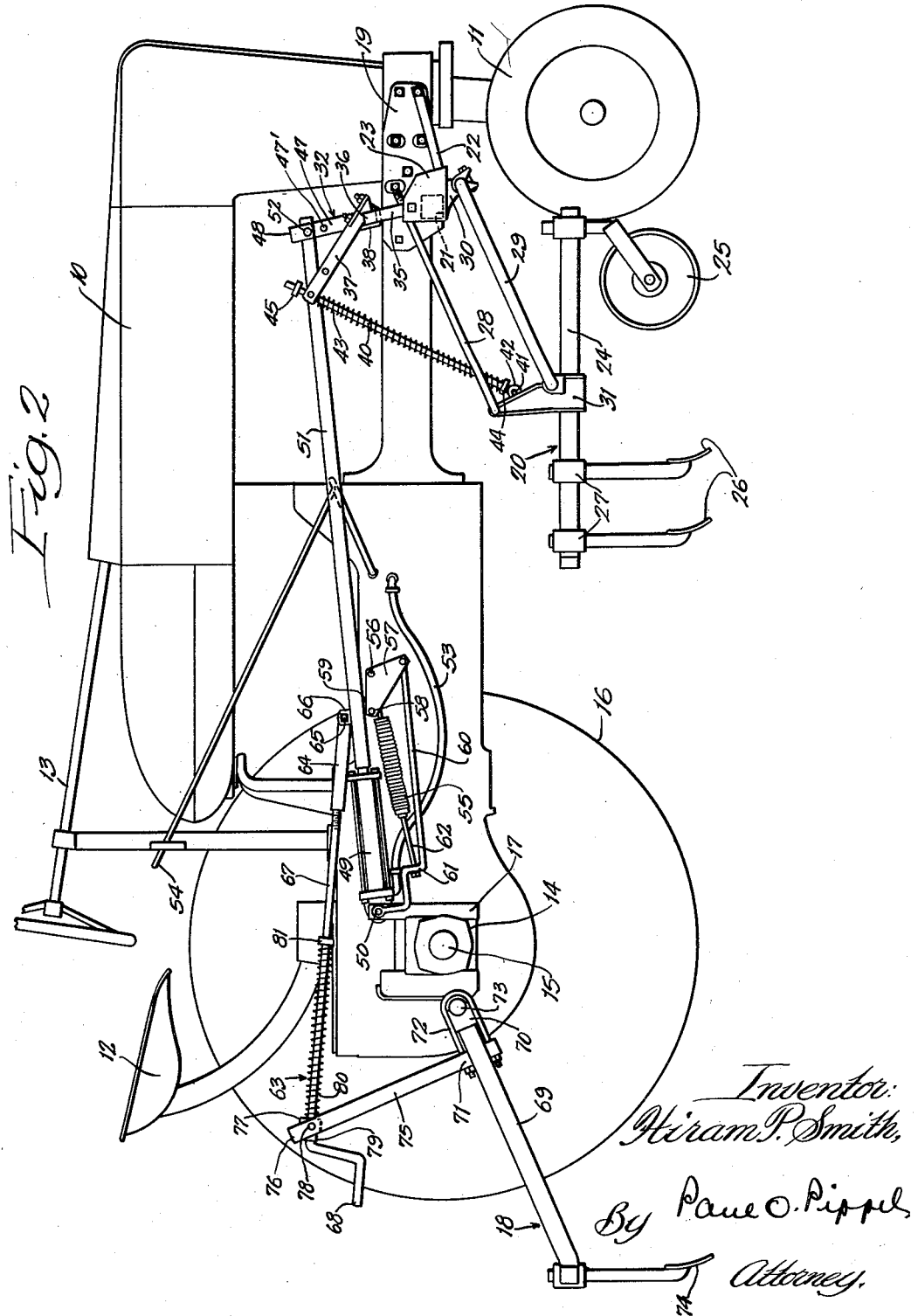

Patented Feb. 20, 1945

2,369,759

UNITED STATES PATENT OFFICE 2,369,759

AGRICULTURAL IMPLEMENT

Hiram P. Smith, Canton, Ill., assignor to International Harvester Company, a corporation of New Jersey Application February 13, 1943, Serial No. 475,705

4 Claims. (Cl. 97—47)

This invention relates to agricultural implements. More particularly the invention relates to direct-connected tractor-mounted implements of the cultivator class and to apparatus utilized to move such an implement to and from ground-working position.

Tractor-mounted cultivators generally comprise front cultivator rigs mounted upon transversely extending draft bars projecting from opposite sides of the forward portion of the tractor and rear rigs directly connected to a support, such as the rear axle housing of the tractor. Power-lift mechanisms have been provided for simultaneously raising or lowering front and rear rigs, and separate lifting mechanisms are generally employed for independent manipulation of the rigs on each side of the tractor. It is also known to provide pivotable lifting elements connected to the power-lift mechanism and to the working tools to effect movement thereof. However, such mechanisms as have been previously employed have been inefficient in their transmission of power from the power lift to working tools. Likewise, they have interfered with the adjustability of the working tools with respect to the draft bar, or they have been of such great height as to impair the field of vision of the tractor operator.

An important object of the present invention is the provision, in combination with means for simultaneously raising or lowering front and rear rigs on one side of a tractor, of means for independently manipulating the rear rig with respect to the front rig.

Another object is the provision of an improved lifting device for connection to the cultivator rigs for moving the implement to and from a ground-working position.

A further object is the provision of a lifting device for interconnection between the power-lift mechanism and the working tools whereby maximum visibility and efficient manipulation of the working tools may be obtained.

These and other objects will become apparent from the following detailed description when read in conjunction with the accompanying drawings, wherein:

Figure 1 is a plan view of a tractor with working tools embodying the features of the present invention mounted on one side thereof;

Figure 2 is a side elevation of the apparatus shown in Figure 1;

Figure 3 is a front elevation of a lifting bail and its mounting upon the draft bar; and Figure 4 is a fragmentary view in section showing two positions of the lifting bail in full and dotted lines.

Referring to the drawings, numeral 10 designates the forwardly extending body portion of a tractor having front wheels 11, an operator's station 12, and a steering mechanism 13. A transverse rear axle structure 14 journals a rear axle 15, upon opposite extremities of which are mounted drive wheels 16. The rear axle structure 14 is provided on each side of the tractor with a bracket structure 17 for the attachment of a rear cultivator rig indicated at 18, and a plate 19 is bolted to the forward portion of the tractor to provide for the attachment of a front cultivator rig 20. While the cultivator rigs on only one side of the tractor are shown in the drawings, it should be understood that both sides of the tractor are similarly equipped. The plate 19 supports a transversely extending draft bar 21 braced by a strap 22 bolted to the plate 19 and to a plate 23 affixed to the outer end of the draft bar. The forward cultivator rig 20 comprises longitudinally extending tool beams 24, the forward end of each of which is provided with a gauge wheel 25. The rear ends of the beams are laterally inclined, and working tools 26 are attached thereto by brackets 27. The cultivator rig 20 is pivotally connected to the draft bar 21 by vertically spaced parallel links 28 and 29 pivotally mounted at one end upon brackets 30 adjustably attached to the draft bar. These parallel links extend rearwardly and downwardly, and their ends are pivotally mounted in brackets 31 attached to the beams 24. Movement of the cultivator rig 20 to and from ground-working position is effected through the intermediary of a lifting mechanism, generally indicated at 32, and including a U-shaped bail 33, one arm 34 of which is pivoted upon the inner plate 19 and the other arm 35 upon the outer plate 23 for rotation about an axis adjacent and parallel to the draft bar 21. The bail 33 has a horizontal portion 36 parallel to the draft bar, and rearwardly extending brackets 37 are adjustably attached thereto by U bolts 38. The rearwardly projecting ends of the brackets 37 are bifurcated to provide arms for the mounting therebetween of swivel nuts 39 orificed to receive for sliding movement push rods 40. The rods 40 are bent at their lower ends to form hooks 41 for insertion in lugs 42 affixed to the brackets 31. The rods 40 thus serve as the connecting link between the rig 20 and the bail 36 so that movement of the working tools to and from ground-working position is accomplished by pivotal movement of the bail 36. Flexibility of the working tools in ground-working position is effected by the provision of springs 43 surrounding the rods 40 and abutting at one end against the swivel nuts 39 and at the other end against a collar 44 keyed to the rod 40. Sliding movement of the rods 40 and swivel nuts 39 is limited by collars 45 keyed to the ends of the rods projecting beyond the swivel nuts.

In order to keep the horizontal portion of the bail 36 as low as possible consistant with efficient operation and still give the operator clear vision of the working area, the bail is provided with an upwardly projecting arm 46, clearly shown in Figure 3. The arm 46 may be affixed to the bail in any suitable manner, and in the form illustrated in Figure 3 it is shown as integral with the arm 34 of the bail and being affixed to the horizontal portion thereof, as by welding. However, it is desirable from the point of view of providing clear vision, that the arm 46 be located as close to the tractor body as possible. This location of the arm 46 is further important in that it is thus brought into alinement with the source of power mounted upon the tractor, hereinafter more fully described. A member 47 is fastened to the arm 46 by bolts 47' and is provided with a hook 48.

Power for moving the working tools to and from ground-working position is supplied by a single-acting fluid cylinder device 49 pivoted upon a bolt 50 in the bracket 17 and adapted to operate a longitudinally extending push rod 51 pivoted at its forward end upon a pin 52 mounted in the hook 48. In its extended position, indicated in dotted lines in Figure 4, the push rod 51 operates to lift the working tools from ground-working position. To effect extension of the push rod 51, fluid is supplied to the rear of the fluid cylinder device 49 through a tube 53 from a source, not shown, located within the body of the tractor and actuated by a control mechanism 54 accessible to the operator's station 12. The fluid cylinder device collapses upon reversal thereof, and the working tools return to ground-working position assisted by the action of a spring 55 connected at its forward end to the pivot 56 of a bell-crank 57, one arm of which is pivoted at 58 upon a lug 59 affixed to the lower surface of the push rod 51. The other arm of the crank 57 is pivoted upon a strap 60, which extends rearwardly and is bent at a right angle to form a portion 61, which is apertured to receive an adjustably threaded bolt 62 connected to the rear end of the spring 55. The rear end of the strap 60 is pivotally connected to the bolt 50 in the bracket 17.

In order to provide for actuation of the rear rig 18 simultaneously with the actuation of the front rig 20, an extensible member 63 is provided comprising a threaded sleeve portion 64 pivoted at 65 upon a lug 66, affixed to the upper surface of the push rod 51, and a crank 67 screw threaded at its forward end for insertion in the sleeve 64 and having a manually operable handle 68 upon the rear thereof. The rear rig 18 comprises a beam 69 pivotally connected, by means of brackets 70 and 71 and U-bolt 72, to a shaft 73 affixed to the rear portion of the tractor. The beam 69 has a laterally extending portion for the attachment of a working tool 74. The beam 69 is connected to the crank 67 by a strap 75, the lower end of which is affixed to the beam and the upper end of which is bent to form a hook 76 having a trunnion 77 pivoted therein at 78. The crank 67 passes through the trunnion 77 and is provided with a collar 79. Surrounding a portion of the crank 67 is a spring 80 abutting at one end against the trunnion 77 and at the other end against a collar 81 keyed to the crank 67. Upon actuation of the fluid cylinder device to raise the working tools, the push rod 51 moves forward to rock the bail 36 carrying with it the member 63, which causes the rear rig 18 to move upward about its pivotal connection with the shaft 73. Independent adjustment of the rear rig with respect to the front rig is effected by manipulation of the extensible member 63 against the action of the spring 80, which further serves to flexibly maintain the working tool in ground-working position.

It is thus observed that a simple and efficient mechanism has been provided for effecting the simultaneous actuation of the front and rear rigs of a tractor-mounted agricultural implement providing both maximum leverage and maximum visibility of the working area and to permit independent manipulation of the rear rigs with respect to the front rigs. While a preferred embodiment of the invention has been described, it is to be understood that variations may be made therein without departing from the spirit of the invention or the scope of the appended claims.

What is claimed is:

1. In an agricultural implement, a support, a transversely extending draft bar affixed to said support, a member pivotally mounted upon said bar for movement about an axis parallel to said bar and having a horizontal portion parallel thereto, earth-working tools pivotally mounted upon said bar, means connecting said earth-working tools to said member for movement therewith, power means upon said support, means upon said member providing an arm of force greater than that represented by the distance between said horizontal portion and said axis, and means connecting said last-mentioned means to said power means.

2. In an agricultural implement, a support, a transversely extending draft bar affixed to said support and projecting laterally therefrom, a U-shaped member pivotally mounted upon said bar for movement about an axis parallel to said bar and having a horizontal portion parallel thereto, earth-working tools pivotally mounted upon said bar between the arms of said U-shaped member, means connecting said earth-working tools to the horizontal portion of said U-shaped member for movement therewith, power means upon said support, a member projecting from said U-shaped member and providing an arm of force greater than that represented by the distance between said horizontal portion and said axis, and means connecting said member to said power means.

3. In combination, a tractor, a transversely extending draft bar affixed to said tractor and projecting laterally therefrom, a U-shaped member pivotally mounted upon said bar at points adjacent the tractor and the projecting end of said bar and having a horizontal portion parallel thereto, earth-working tools pivotally mounted upon said bar between the arms of said U-shaped member, means connecting said earth-working tools to the horizontal portion of said U-shaped member for movement therewith, power means upon said tractor, a member projecting from said U-shaped member at a point adjacent said tractor and providing an arm of force greater than that represented by the distance between said horizontal portion and said bar, and means connecting said member to said power means, said member, said power means and said connecting means being substantially in longitudinal alinement and positioned so close to the tractor as to permit clear vision of the area being worked by the working tools.

4. In combination, a tractor, a transversely extending draft bar affixed to said tractor and projecting laterally therefrom, a U-shaped member pivotally mounted upon said bar at a point adjacent the tractor and having a horizontal portion parallel to said bar, earth-working tools pivotally mounted upon said bar between the arms of said U-shaped member, said horizontal portion being spaced from said bar a distance insufficient to interfere with visibility of the working area, but sufficient to permit adjustment of the working tools mounted upon said bar, means connecting said earth-working tools to the horizontal portion of said U-shaped member for movement therewith, power means upon said tractor, a member projecting from the end of said horizontal portion nearest the tractor and closely adjacent the point of pivot of said U-shaped member, said member being substantially in longitudinal alinement with said power means and providing an arm of force greater than that represented by the distance between said horizontal portion and said bar, and means connecting said member to said power means, said member, said power means, and said connecting means being positioned so close to the body of the tractor as to permit clear vision of the area being worked by the working tools.

HIRAM P. SMITH.